(12) United States Patent
Britt, Jr.

(10) Patent No.: US 10,167,997 B2
(45) Date of Patent: Jan. 1, 2019

(54) GAIN PLATE

(71) Applicant: William F. Britt, Jr., Birmingham, AL (US)

(72) Inventor: William F. Britt, Jr., Birmingham, AL (US)

(*) Notice: Subject to any disclaimer, the term of this patent is extended or adjusted under 35 U.S.C. 154(b) by 0 days.

(21) Appl. No.: 15/687,653

(22) Filed: Aug. 28, 2017

(65) Prior Publication Data

US 2018/0058628 A1   Mar. 1, 2018

Related U.S. Application Data

(60) Provisional application No. 62/238,601, filed on Sep. 1, 2016.

(51) Int. Cl.

| | | |
|---|---|---|
| *F16M 13/02* | (2006.01) | |
| *E04H 12/00* | (2006.01) | |
| *E04H 12/24* | (2006.01) | |
| *H02G 7/20* | (2006.01) | |
| *E04H 12/20* | (2006.01) | |
| *F16B 7/18* | (2006.01) | |

(52) U.S. Cl.
CPC ............ *F16M 13/02* (2013.01); *E04H 12/20* (2013.01); *E04H 12/24* (2013.01); *F16B 7/18* (2013.01); *H02G 7/20* (2013.01)

(58) Field of Classification Search
CPC ........ F16M 13/02; E04H 12/20; E04H 12/22; E04H 12/24; F01D 25/24; H02G 7/20
USPC ............... 248/219.2, 219.3, 218.4; 403/347; 52/633, 697
See application file for complete search history.

(56) References Cited

U.S. PATENT DOCUMENTS

| | | | | |
|---|---|---|---|---|
| 868,591 | A * | 10/1907 | Eeyaxley | |
| 2,828,515 | A * | 4/1958 | Jenne | E04H 12/22 52/156 |
| 4,032,244 | A * | 6/1977 | Quayle | E02D 5/523 403/286 |
| 4,899,963 | A * | 2/1990 | Murphy | F16L 3/137 24/16 R |
| 6,626,406 | B1 * | 9/2003 | Olson, Jr. | H02G 7/20 248/219.2 |
| 7,849,659 | B2 * | 12/2010 | Kopshever, Sr. | H01Q 1/1242 52/18 |

* cited by examiner

*Primary Examiner* — Tan Le
(74) *Attorney, Agent, or Firm* — Michael L. Leetzow, P.A.

(57) ABSTRACT

A gain plate is made of reinforced plastic for attaching to a pole and a cross arm and includes a pole channel and a cross arm channel. The pole channel has a front plate, two side plates, and two end plates that that form a rear-facing cavity. There are a plurality of cross members disposed in the rear-facing cavity and at least some of the plurality of cross members having radiused surface. The cross arm channel is disposed perpendicularly to the pole channel, the cross arm channel configured to received therein a cross arm.

18 Claims, 9 Drawing Sheets

GAIN PLATE

REFERENCE TO RELATED CASE

This application claims priority under 35 U.S.C. § 119(e) to provisional application No. 62/382,601 filed on Sep. 1, 2016, the contents of which are hereby incorporated by reference in their entirety.

BACKGROUND OF THE INVENTION

Field of the Invention

The invention relates to a composite structural bracket (also known as a gain plate) for use in the power industry and other industries that use poles to string wires and/or cables. The invention is used to attach a wood or composite cross arm to a wood or composite power or utility pole. The prior art metal brackets tend to increase the possibility of lightning striles that result in power outages, pole top fires and loss of the cross arm and pole. The present invention provides a non-conductive bracket that may reduce lightning strikes by replacing the metallic bracket with a composite non-conductive bracket. In addition to reduced lightning strikes this non-conductive bracket reduces the possibility of pole top fires caused by electrical flash over or an electrical short between conductors.

The main advantage that this invention offers is a design and manufacturing method that allows the elements of the device to be structurally matched to the multi-directional loading that is common to these brackets when subjected to actual conductor loading.

The composite bracket is as much as 80% lighter than the metal bracket, which makes it easier to install because it reduces the need for heavy equipment to lift a cross arm assembly to the pole top for installation.

The bracket is also designed to be manufactured by injection molding. In this manner, high quality components that have high strength and uniform properties can be easily produced. Fabrication of metal brackets requires skilled craftsmen to insure quality and uniformity. Metal fabrication requires several steps to complete the bracket and is time consuming. The molded composite bracket can be completed in a little as three minutes and thereby reduces cost and provides a bracket that has uniform structural properties.

The composite bracket (gain plate) consists of a reinforced plastic material that is corrosion resistant. Metal brackets deteriorate when subjected to the corrosive conditions that are found in wet and humid areas and eventually lose structural strength. Plastic or composites are highly resistant to these conditions and maintain strength over the life span of the bracket.

SUMMARY OF THE INVENTION

The present invention is directed to a gain plate made of reinforced plastic for attaching to a pole and a cross arm that includes a pole channel that includes a front plate having a first end and a second end and a front surface extending along at least a portion the front plate, two side plates extending from the front plate between the first end and second end and in a direction away from a direction the front surface faces, a first end plate having a first edge attached to the first end of the front plate and each of the side plates, and having a second edge having a first radius, a second end plate having a first edge attached to the second end of the front plate and each of the side plates, and having a second edge having a second radius and wherein the front plate, the two side plates and the first and second end plates form a rear-facing cavity, a plurality of cross members disposed in the rear-facing cavity, at least some of the plurality of cross members being radiused, and a cross arm channel disposed perpendicularly to the pole channel, the cross arm channel configured to received therein a cross arm.

In some embodiments, the two side plates are parallel to one another.

In some other embodiments, the cross arm channel has a bottom wall, and a rear wall, the rear wall being parallel to the front surface of the front plate of the pole channel.

In another embodiment, the gain plate also includes a guy lug member extending outwardly from the front surface of the front plate and downward from a bottom surface of the bottom wall of the cross arm channel.

According to another aspect of the present invention, the invention is directed to gain plate made of reinforced plastic for attaching to a pole and a cross arm that includes a pole channel that includes a front plate having a first end and a second end and a front surface extending along at least a portion the front plate, two side plates extending from the front plate between the first end and second end and in a direction away from a direction the front surface faces, a first end plate having a first edge attached to the first end of the front plate and each of the side plates, and having a second edge having a first radius, a second end plate having a first edge attached to the second end of the front plate and each of the side plates, and having a second edge having a second radius, wherein the front plate, the two side plates and the first and second end plates form a rear-facing cavity, and a plurality of cross members disposed in the rear-facing cavity extending between the side plates or the end plates, at least some of the plurality of cross members being radiused.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE PREFERRED EMBODIMENTS

Figure 1:
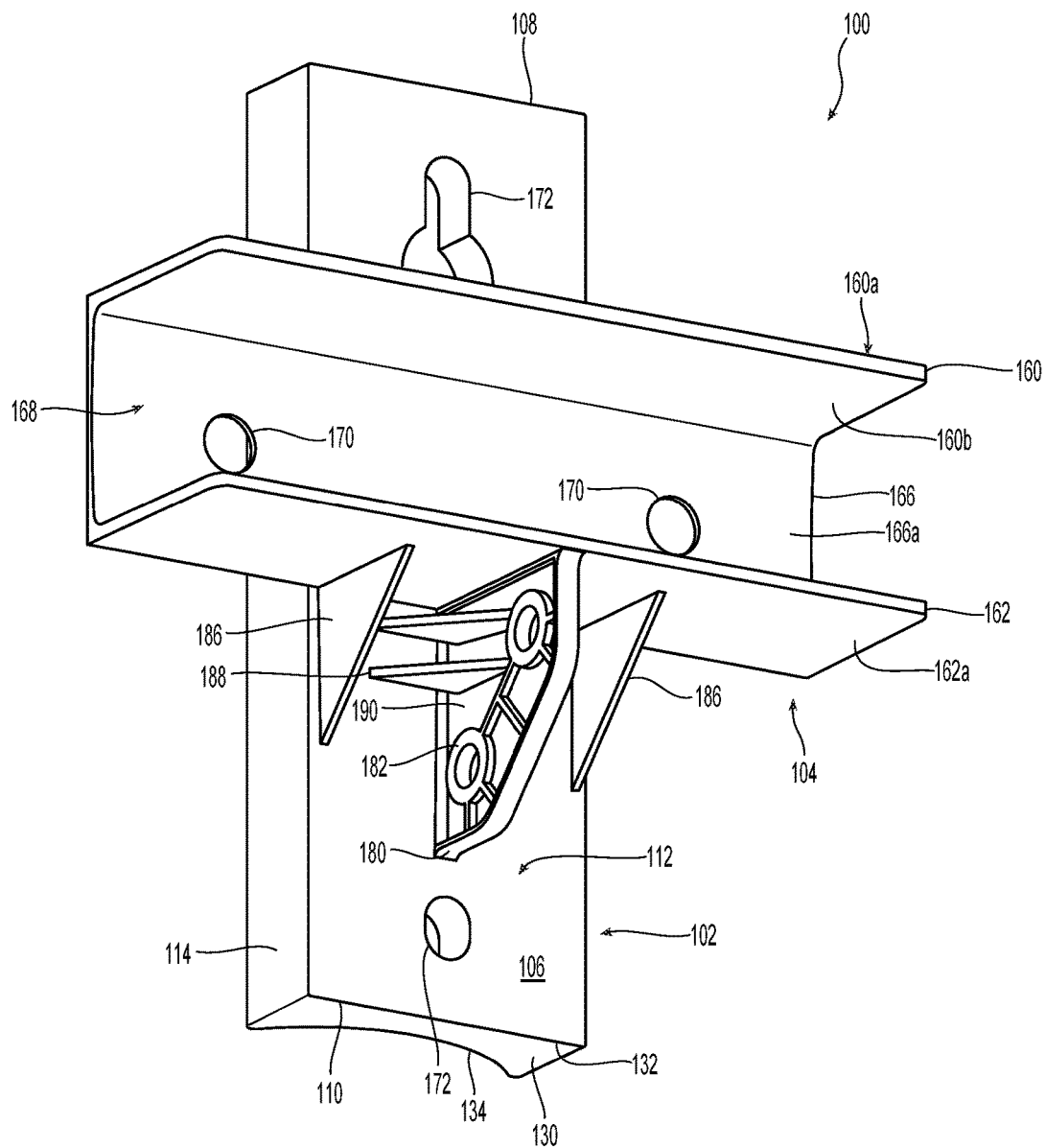
FIG. 1 is a perspective view from the lower front left of one embodiment of a gain plate according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Figure 9:
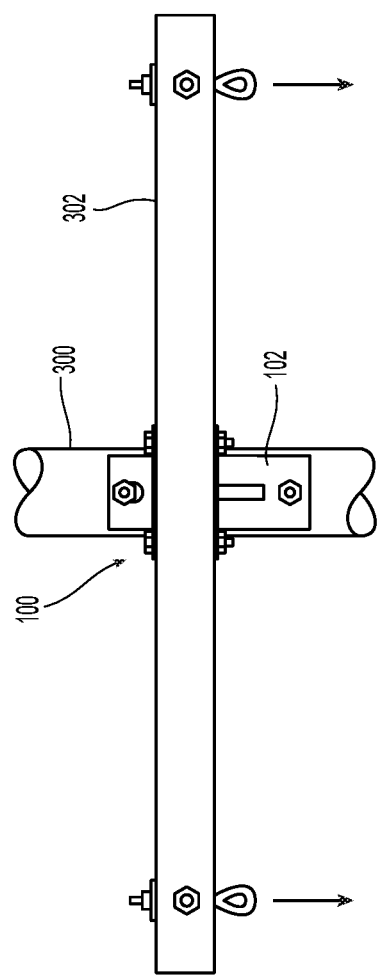
FIG. 9 is front view of the gain plate of FIG. 1 attached to a pole and showing the vertical forces exerted thereon.
Figure 10:
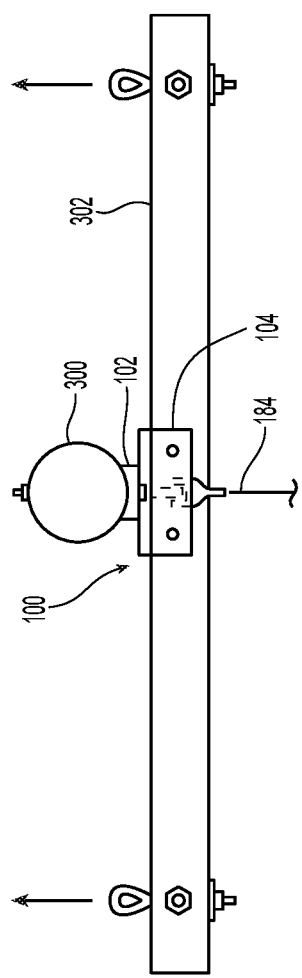
FIG. 10 is top view of the gain plate of FIG. 1 attached to a pole and showing the horizontal forces exerted thereon.

Referring to FIGS. 1-7, there is one embodiment of a gain plate 100 made of reinforced plastic for attaching to a pole (telephone, utility, etc.) and a cross arm (see FIGS. 9 and 10). The gain plate 100 includes a pole channel 102 and a cross arm channel 104. The pole channel 102 has a front plate 106 having a first end 108 and a second end 110. The front plate 106 has a front surface 112 extending along at least a portion the front plate 106, and preferably between the first end 108 and the second end 110. As is visible in the figures, the front surface 112 may be interrupted by the cross arm channel 104 as discussed in more detail below.

Figure 3:
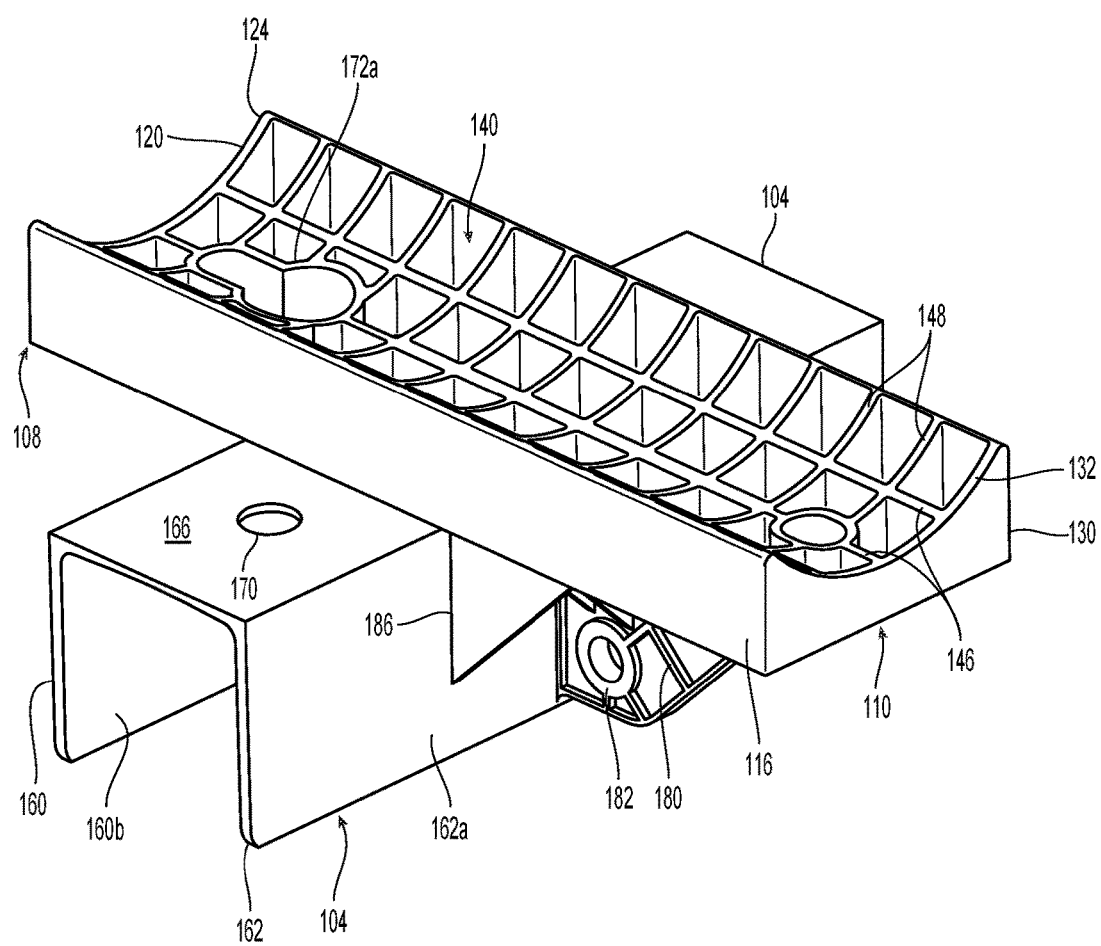
FIG. 3 is a perspective view from the lower right side of the gain plate of FIG. 1.
Figure 4:
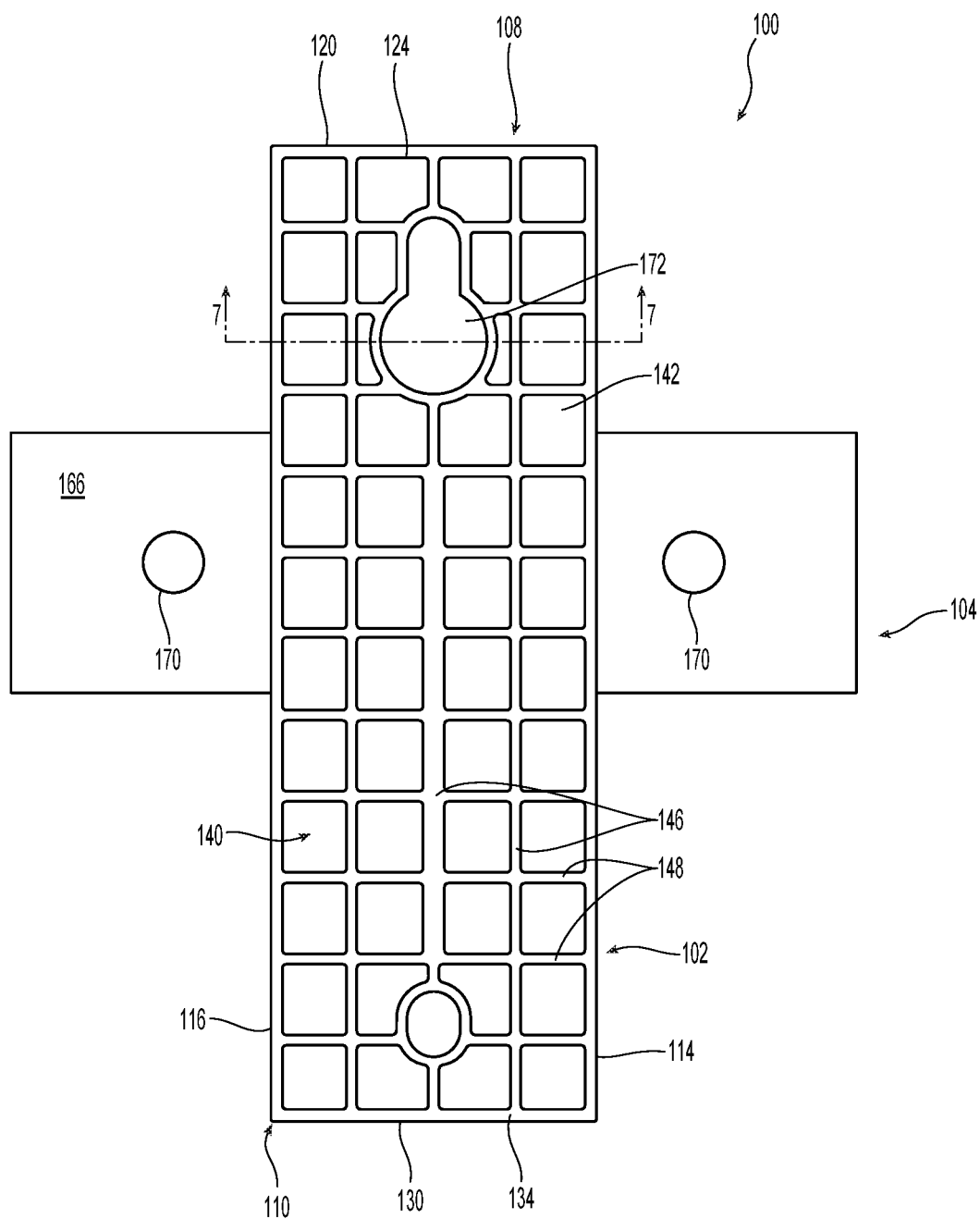
FIG. 4 is a rear elevational view of the gain plate of FIG. 1.
Figure 5:
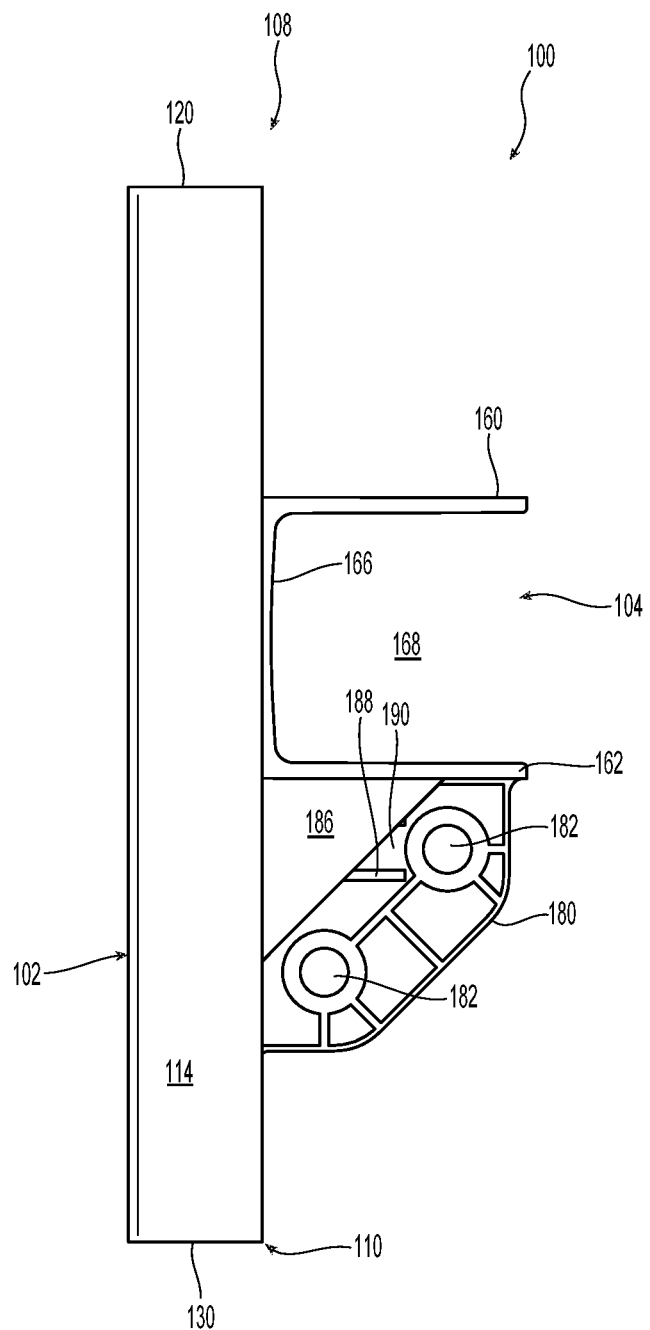
FIG. 5 is a left side elevational view of the gain plate of FIG. 1.
Figure 6:
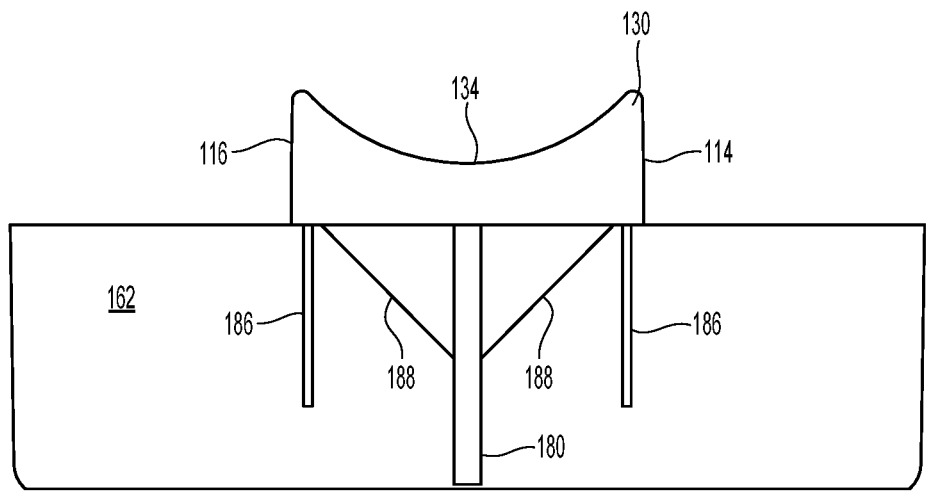
FIG. 6 is a bottom view of the gain plate of FIG. 1.
Figure 7:
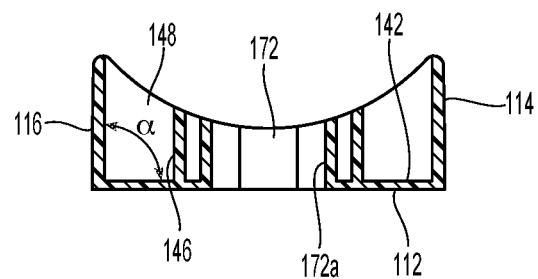
FIG. 7 is a cross section view of the gain plate of FIG. 1 along the line 7-7 in FIG. 2.

Along each side of the front plate 106 are two side plates 114,116, the side plates 114,116 extend from (are attached to) the front plate 106 between the first end 108 and second end 110 and in a rearward direction, that is away from the direction the front surface 112 faces (which is as illustrated in FIG. 1 in a front or forward direct and away from the pole on which the gain plate 100 is attached). See also FIGS. 9-12. As best seen in FIGS. 3 and 6, the two side plates 114,116 extend rearwardly and perpendicularly to the front surface 112 of the front plate 106. As a result, the two side plates 114,116 are parallel to one another and where an interior angle $\propto$ formed by the front plate and the two side plates 114,116 is 90°. See FIG. 7. The two side plates 114,116 could also extend rearwardly in a manner where the two side plates 114,116 are not parallel to one another, but rather where the angle $\propto$ formed by the front plate 106 and the two side plates 114,116 is greater than 90°.

The gain plate 100 also has a first end plate 120 having a first edge 122 attached to the first end 108 of the front plate 106 and to the ends of each of the side plates 114,116. The first end plate 120 also has a second edge 124 opposite the first edge 122 and the second edge 124 has a first radius R1.

The gain plate 100 also has a second end plate 130 that has a first edge 132 attached to the second end 110 of the front plate 106 and to the ends of each of the side plates 114,116. The second end plate 130 has a second edge 134 opposite the first edge 132 and the second edge 134 has a second radius R2. The first radius R1 and the second radius R2 preferably have the same radius—between 6 and 8 inches, but they could have different radii. If the two radii R1,R2 were to be different, the end of the gain plate 100 that is attached closer to the top of the pole will have the smaller radius.

It is noted that most if not all of the utility/telephone poles have a taper of about 0.175" per foot. Thus, a 35 foot pole will typically have a base radius of 12" and a top radius of 6". The 45 foot pole typically has a base radius of 16" and a top radius of 8". Thus, the radii R1,R2 can be between 6" and 8".

Figure 2:
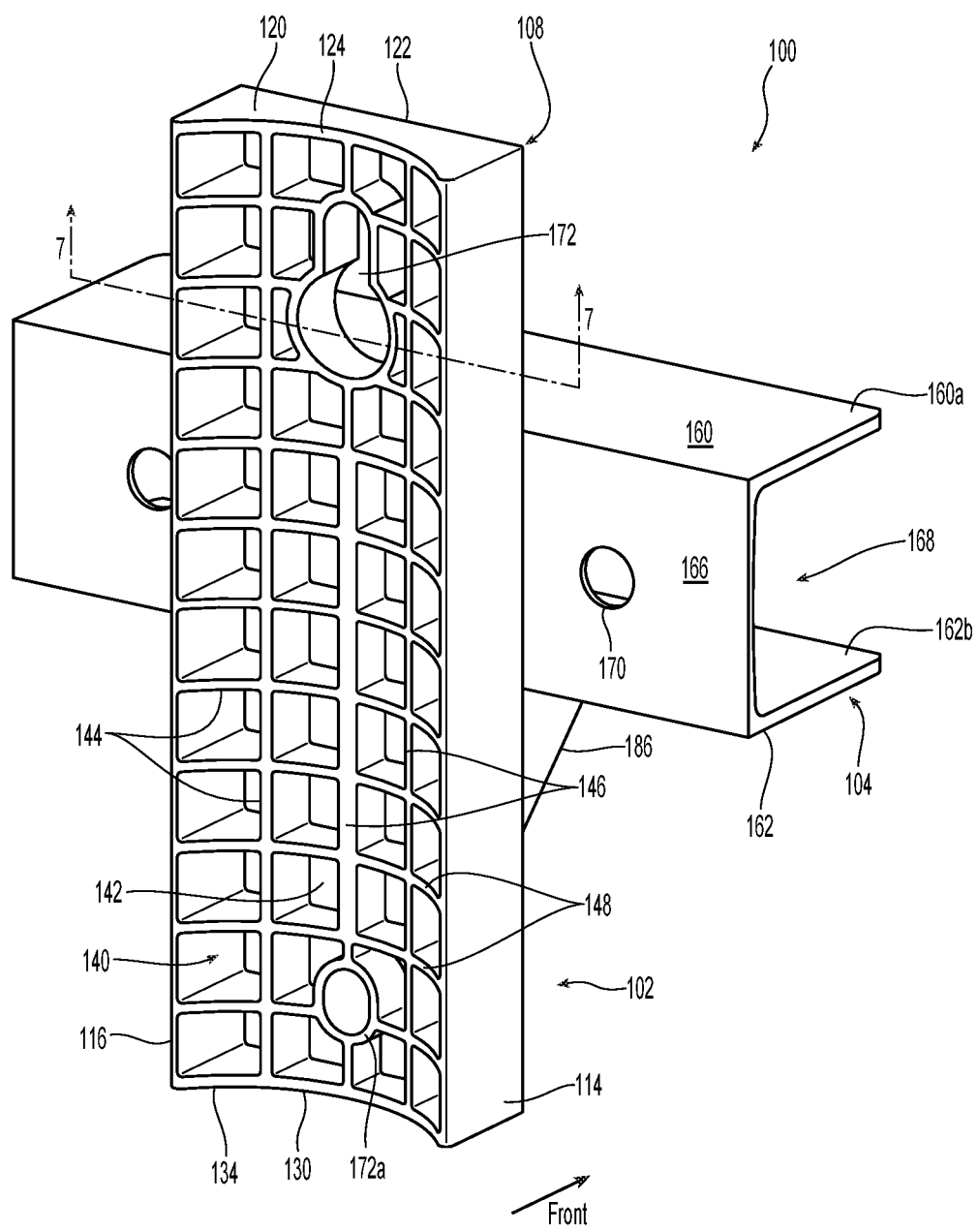
FIG. 2 is a perspective view from the upper left back of the gain plate of FIG. 1.
Figure 8:
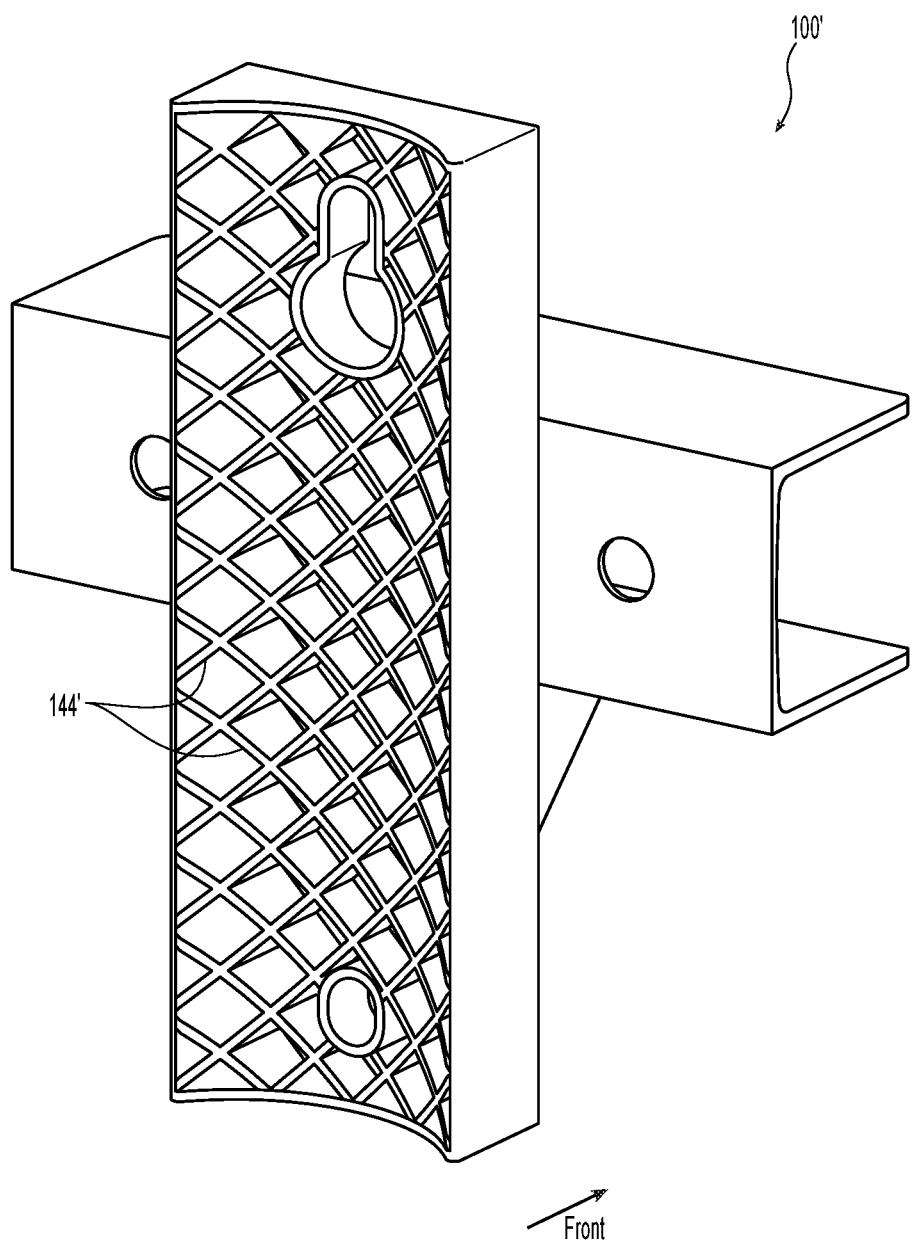
FIG. 8 is a perspective view from the upper left back of a second embodiment of a gain plate according to the present invention.

As illustrated in FIGS. 2 and 3, the front plate 106, the two side plates 114,116 and the first and second end plates 120,130 form a rear-facing cavity 140. The rear-facing cavity 140 has a bottom surface 142 that corresponds with the rear face of the front plate 106. Within the rear-facing cavity 140 are a plurality of cross members 144. The plurality of cross members 144 is further divided into a first plurality of cross members 146 and a second plurality of cross members 148. The first plurality of cross members 146 extend between the first and second end plates 120,130 and engage the bottom surface 142 of the rear-facing cavity 140. The second plurality of cross members 148 extend between the two side plates 114,116 and engage the bottom surface 142 of the rear-facing cavity 140. It should be noted that the plurality of cross members 144 are all formed at the same time and are contiguous with one another. The first plurality of cross members 146 and the second plurality of cross members 148 are preferably perpendicular to one another, thereby forming squares (or rectangles depending on their spacing) within the rear-facing cavity 140. As illustrated in FIG. 8, another embodiment of a gain plate 100' is illustrated with a plurality of cross members 144' that are rotated relative to the gain plate 100' and at least some of the plurality of cross members 144' extend between an end plate and a side plate.

As seen in FIG. 3, the second plurality of cross members 148 are curved or radiused. Thus, the height of the second plurality of cross members 148 changes across the width W of the rear-facing cavity 140 from the bottom surface 142 of the rear-facing cavity 140 to a top surface 150. The radius of curvature preferably matches that of the end plates 120,130. However, if the end plates 120,130 have different radii, then the radius of the second plurality of cross members 148 changes incrementally to match the radii of the end plates 120,130.

Each of the first plurality of cross members 146 extend between the two end plates 120,130 and also engage the bottom surface 142. They are of a constant height along a length L of the rear-facing cavity 140. While each of the first plurality of cross members 146 are of a constant height, they may not all have the same height so as to correspond with the curvature of the second plurality of cross members 148.

It is anticipated that, depending on the diameter of the pole on which the gain plate 100 is to be attached and the radii of the end plates and cross members, at least some of the cross members (and the end plates) will engage the pole. However, since most utility poles are tapered, it is more likely that the first end 108 will engage the pole 300. Naturally, the second end 110 could also be dimensioned so that the second end also engages the pole. The long edge of the side plates 114,116 would engage the pole if the pole diameter were larger. At this point, the plurality of cross members provide the strength to the gain plate by their attachment to the bottom surface 142 and the end and side plates.

The gain plate 100 also has a cross arm channel 104 disposed perpendicularly to the pole channel 102. As illustrated, the cross arm channel 104 has a top wall 160 and a bottom wall 162, that are spaced apart from one another along the length of pole channel 102. The top wall 162 and the bottom wall 164 also extend outwardly from the front surface 112 of the front plate 106. The cross arm channel 104 also has a rear wall 166, with a portion of the rear wall 166 being the same as the front surface 112 of the front plate 106. The three walls thus create a channel 168 into which the cross arms 302 secured. See, e.g., FIGS. 5, 9, and 10. However, the rear wall 166 may also lie in a different plane than the front surface 112 of the front plate 106.

The top wall has an outer surface 160a and an inner surface 160b. The bottom wall 162 an outer surface 162a and an inner surface 162b. The rear wall 166 has an inner surface 166a and an outer surface 166b. The inner surfaces of the walls 162,164,166 assist to define the channel 168.

Figure 11:
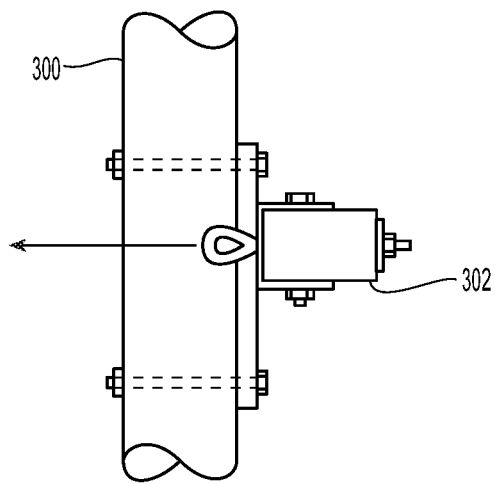
FIG. 11 is a side view of a gain plate, a cross arm, and a pole.
Figure 12:
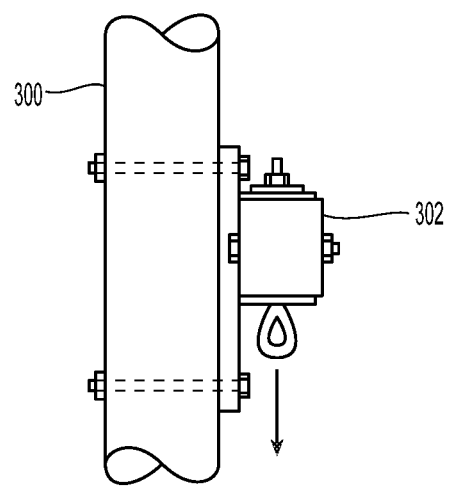
FIG. 12 is a side view of a gain plate, a cross arm, and a pole.

It should be noted that not all of the cross arms are square in cross section, but may be rectangular. See, e.g., FIGS. 11 and 12. If the cross arms 302 are rectangular, then the long cross sectional axis is positioned along the line of force. FIG. 11 illustrates the situation at the end of a transmission line (dead end loading), when the force is a horizontal force. Thus, the long axis of the cross arm (across the cross arm) is also horizontal. FIG. 12 illustrates the use of a gain plate between the dead ends, where the load is vertical (tangential loading). As is clear from these figures, there are two different gain plates used in these two situations and they are not interchangeable. The gain plate in FIG. 11 can not be used for a tangential loading situation because the channel for the cross arm is not tall enough to accept the cross arm in its proper orientation. Similarly, in a dead end loading situation (with the long axis horizontal), the gain plate in FIG. 12 can not be used as the cross arm will extend beyond the bottom wall and there will be a space between the top wall of the top of the cross arm. This space prevents a bolt from being inserted vertically (through the bottom and top walls) in the cross arm.

As a result, the cross arm channel 104 may not have a top wall 160, but rather only the bottom wall 162 and rear wall 166. This allows for the cross arms 300 to be fastened to the bottom wall 162 and/or rear wall 166, depending on the orientation of the cross arm. This prevents the need to have two (or more) different sized gain brackets available to the installer. While there are holes 170 in the rear wall 166 for bolting the cross arm 300 within the channel 168, there may also be holes in the bottom wall 162 (and top wall 160 if present—see FIGS. 9 and 10). Naturally, if the cross arms are square in cross section, then only one gain plate is needed since it can be accommodated in both configurations.

Returning to FIGS. 1-7, the gain plate 100 also has holes 172 in the front plate 102 to allow the gain plate 100 to be secured to the pole 300. The plurality of cross members 144 also include portions 172a that circumscribe the holes 172 to provide more structural support at the holes 172.

The gain plate 100 also has a guy lug member 180 extending outwardly from the front surface 112 of the front plate 106 and downward from the outer surface 162a of the bottom wall 162 of the cross arm channel 104. The guy lug member 180 has two openings 182 therethrough to allow for attachment of a guy wire 184 (see FIG. 10) to add stability to the utility/telephone pole 300. The guy wire 184 assists with keeping the pole vertical with the horizontal loads. The gain plate 100 may also have other support tabs 186 on either side of the guy lug member 180 to provide further support for the vertical loading conditions. See FIG. 1. As with the guy lug member 180, the support tabs 186 extend outwardly from the front surface 112 of the front plate 106 and downward from the outer surface 162a of the bottom wall 162 of the cross arm channel 104. While two are shown, there could be more or fewer.

There may also be secondary supports 188 that are disposed on the sides of the guy lug member 180. The secondary supports 188 extend from a side 190 of the guy lug member 180 and the front surface 112 of the front plate 106. See FIG. 1. While the supports are illustrated as being triangular in shape, the supports could be of any appropriate shape.

The gain plate 100 is preferably injection molded in a single shot. The material used is thermoplastic material such as a phenoxy, a polysulfone, a polyarylsulfone, a polyether- sulfone, a polyimide, a polyquinoxaline, a polyphenylquinoxaline, a polyphenylene oxide or a polyphenyl sulfide. The thermoplastic is also reinforced with a structural filament fiber such as those made from boron, KEVLAR, glass, and/or carbon. The combination of the reinforcement and thermoplastic is commonly designated as LFRT (long fiber reinforced thermoplastic).

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

I claim:

1. A gain plate made of reinforced plastic for attaching to a pole and a cross arm comprising:
    a pole channel comprising:
        a front plate having a first end and a second end and a front surface extending along at least a portion the front plate;
        two side plates extending from the front plate between the first end and second end and in a direction away from a direction the front surface faces;
        a first end plate having a first edge attached to the first end of the front plate and each of the side plates, and having a second edge having a first radius;
        a second end plate having a first edge attached to the second end of the front plate and each of the side plates, and having a second edge having a second radius, wherein the front plate, the two side plates and the first and second end plates form a rear-facing cavity;
    a plurality of cross members disposed in the rear-facing cavity, at least some of the plurality of cross members being radiused; and
    a cross arm channel disposed perpendicularly to the pole channel, the cross arm channel configured to received therein a cross arm.

2. The gain plate according to claim 1, further comprising two holes in the pole channel to receive bolts therein.

3. The gain plate according to claim 1, wherein the reinforced plastic comprises a thermoplastic having a fiber embedded therein.

4. The gain plate according to claim 1, wherein the two side plates are parallel to one another.

5. The gain plate according to claim 1, wherein the cross arm channel has a bottom wall, and a rear wall, the rear wall being parallel to the front surface of the front plate of the pole channel.

6. The gain plate according to claim 5, further comprising a guy lug member extending outwardly from the front surface of the front plate and downward from a bottom surface of the bottom wall of the cross arm channel.

7. The gain plate according to claim 5, wherein the cross arm channel further comprises a top wall creating a u-shaped channel with the bottom wall and rear wall to receive a cross arm therein.

8. The gain plate according to claim 1, wherein the first radius and the second radius are the same.

9. The gain plate according to claim 1, wherein the radiused surfaces of the cross members face in a direction opposite to a direction the front surface faces.

10. The gain plate according to claim 1, wherein the plurality of cross members comprises a first plurality of cross members and a second plurality of cross members, the first plurality of cross members being perpendicular to the second plurality of cross members.

11. The gain plate according to claim 10, wherein the first plurality of cross members extend between a side plate and the first end plate and the second plurality of cross members extend between the other side plate and the second end plate.

12. The gain plate according to claim 10, wherein the first plurality of cross members extend between the side plates and the second plurality of cross members extend between the end plates.

13. The gain plate according to claim 5, wherein a portion of the rear wall of the cross arm channel is a portion of the front plate of the pole channel.

14. The gain plate according to claim 1, wherein at least some of the plurality of cross members and the side plates make contact with the pole when attached thereto.

15. The gain plate according to claim 3, wherein the reinforced plastic comprises a long fiber reinforced thermoplastic.

16. The gain plate according to claim 6, further comprising at least one support member extending outwardly from the front surface of the front plate and downward from a bottom surface of the bottom wall of the cross arm channel.

17. The gain plate according to claim 6, further comprising two support members extending outwardly from the front surface of the front plate and downward from a bottom surface of the bottom wall of the cross arm channel and disposed on either side of the guy lug member.

18. The gain plate according to claim 2, wherein one of the two holes in the pole channel has a key-hole shape.

* * * * *